Aug. 1, 1950     F. O. RUNNELLS     2,517,355
CONDUIT CUTTER

Filed Sept. 9, 1948     2 Sheets-Sheet 1

INVENTOR.
FRED O. RUNNELLS
BY
ATTORNEY

Aug. 1, 1950     F. O. RUNNELLS     2,517,355
CONDUIT CUTTER

Filed Sept. 9, 1948     2 Sheets-Sheet 2

INVENTOR.
FRED O. RUNNELLS
BY
ATTORNEY

Patented Aug. 1, 1950

2,517,355

UNITED STATES PATENT OFFICE 2,517,355

CONDUIT CUTTER

Frederick O. Runnells, Detroit, Mich.

Application September 9, 1948, Serial No. 48,440

5 Claims. (Cl. 30—93)

This invention relates to a pipe cutting machine and has for an object the provision of a device which will facilitate the cutting of a pipe by a chipping operation along a circumferential line.

Another object of the invention is to provide a pair of chisels which alternately strike the pipe in spaced relation to produce first a cutting operation and then a chip removing operation.

Another object of the present invention is to provide a means to rotate the pipe a predetermined distance upon the completion of one chipping operation.

Still another object of the invention is to provide a pair of cams which lift the chisels away from the pipe and a pair of springs which drive the chisels into cutting engagement with the pipe.

A further object of the invention is to provide the device with a means for raising or lowering the chisel carrying head to provide for an adjustment for various sizes of pipe.

Another object of the invention is to provide means to adjust the anvil on the base so that the chisels can strike on different radii of the pipe.

Other objects and advantages of the invention will more fully appear from the following description taken in connection with the accompanying drawings in which.

Figure 1:
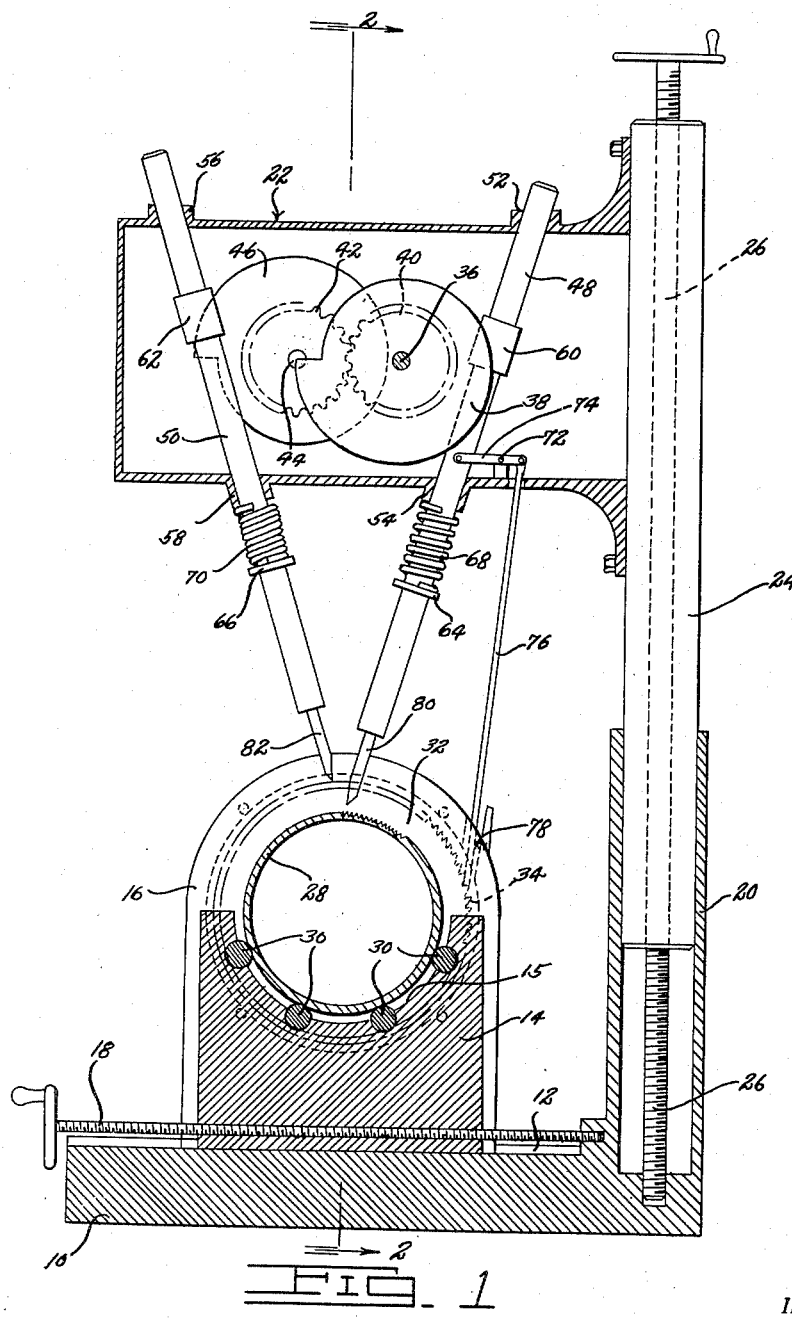
Fig. 1 is a side sectional view of the device.
Figure 2:
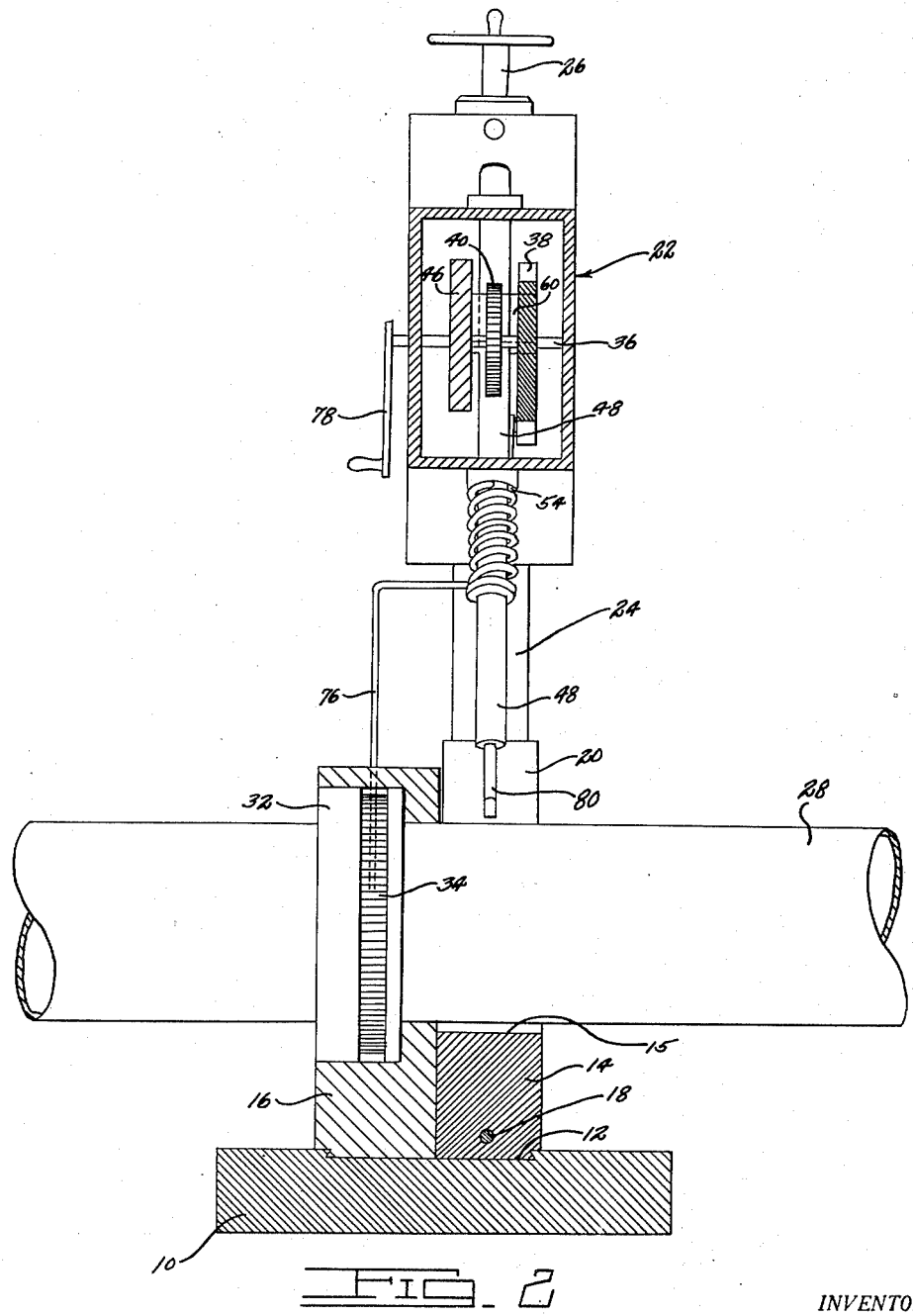
Fig. 2 is a sectional view of the device taken on line 2—2 of Fig. 1.

Referring to the drawings, I have shown a base 10 provided with a slideway 12 in which an anvil 14 and a chuck support 16 are slidably mounted. An adjusting means 18 is provided to move the anvil 14 and the chuck support 16 in the slideway 12. At the rear of the base 10 an upwardly extending tubular support member 20 is provided. A hollow head 22 is carried by a shaft 24 which in turn is slidably mounted within the tubular support member 20. A screw means 26 is provided to raise or lower the head 22.

The upper surface of the anvil 14 is indented having a semi-circular channel 15 which receives the work piece 28. The work piece 28 is supported upon rollers 30 which are journaled in the channel 15 of the anvil 14. To one side and in alignment with the anvil 14 is the chuck support 16. A chuck 32, provided with lateral serrations 34 around its outside surface, is supported within the chuck support 16 and is secured by a detachable means to the work piece 28.

A shaft 36 is journaled within the hollow head 22 and carries a cam 38 and a pinion 40. The pinion 40 meshes with another pinion 42 which is mounted upon a shaft 44 which in turn carries a second cam 46. A crank 78 has been provided to power the shaft 36 but any power means may be used such as a motor. A pair of substantially vertical plungers 48 and 50 are provided through the hollow head 22 and extend downwardly therefrom. One of the plungers 48 is slidably mounted in the upper wall of the head at 52 and in the lower wall at 54. The other plunger 50 is slidably mounted in the upper wall of the head at 56 and in the lower wall at 58. The upper bearings 52 and 56 are a greater distance apart than the lower bearings 54 and 58 thereby allowing the plungers 48 and 50 to converge at the work piece 28. Slide blocks 60 and 62 are secured to the plungers 48 and 50 within the hollow head 22 and at such a position as to ride upon the cams 38 and 46 respectively. Spring stops 64 and 66 are provided on the external downwardly extending portions of the plungers 48 and 50 respectively and coil springs 68 and 70 cooperate between the spring stops 64 and 66 and the lower surface of the bottom wall of the hollow head 22 to drive the plungers downwardly.

Attached to plunger 48 and pivoted at 72 to a support is a lever 74 the free end of which is pivotally secured to a downwardly extending rod 76. The lower end of the rod 76 extends through the chuck support 16 and against the chuck 32, a spring 78 forces the rod 76 into engagement with the serrations 34 of the chuck 32. Cutting chisels 80 and 82 are provided at the lower ends of the plungers 48 and 50 and are so positioned as to strike the work piece 28 at a predetermined distance from one another.

In a cycle of operation of this device, power is applied to the shaft 36 which turns pinion 40 and cam 38. The pinion 40 drives the pinion 42 which powers the shaft 44 and turns the cam 46. The cams 38 and 46 have their high spots on the same side while the plungers 48 and 50 are on opposite sides of the cams, therefore as the high spot of cam 46 is in contact with the slide block 62, plunger 50 is in its full raised position while plunger 48 is in a partly raised position.

The high spot of cam 38 contacts slide block 60 raising the plunger 48 and compressing the spring 68. As the plunger 48 is raised the arm 74 is pivoted about its pivot 72 which forces the rod 76 downwardly causing the chuck to rotate carrying the work piece around with it. As the high spot of the cam 38 passes the slide block 60 the plunger 48 is driven downwardly by spring 68, thereby causing the chisel 80 to strike the work piece 28 forming a cut therein. As the cycle progresses the high spot of cam 46 passes the slide block 62 and the plunger 50 is forced downwardly by the action of spring 70, thereby causing the chisel 82 to strike the work piece 28 and completing the cut started by the chisel 80. As the plunger 48 was forced downwardly by spring 68 the lever arm 74 was again pivoted lifting the rod 76 upwardly into the next serration preparatory to revolving the work piece 28 during the next cycle. By repeating this cycle, a circumferential line of cut notches may be formed around the work piece to facilitate the severance of a portion thereof.

The device has been illustrated in a preferred form of the invention but it will be understood that various changes including the size, shape, and arrangement of parts may be made without departing from the spirit of my invention and it is not my intention to limit its scope other than by the terms of the appended claims.

I claim:

1. A pipe cutting machine comprising a rotatable support for the work, a head adjustably positioned relative to said support, alternately reciprocable chisels carried by said head for striking the work, and means for reciprocating said chisels, said chisels being so positioned as to have overlapping cutting paths in the outer surface of the work whereby a portion of the work is removed as a chip.

2. A pipe cutting machine comprising a rotatable support for the work, a head adjustably positioned relative to said support, reciprocable chisels carried by said head for striking the work, means for reciprocating said chisels, and means for angularly moving said rotatable support after each reciprocation of one of said chisels for advancing the work, said chisels being so positioned as to have overlapping cutting paths in the outer surface of the work whereby a portion of the work is removed as a chip.

3. A pipe cutting machine comprising a rotatable support for the work, a head adjacent said support, reciprocating cutting tools carried by said head, cams for reciprocating said tools, and means for indexing said support after the reciprocation of said tools, said chisels being so positioned as to have overlapping cutting paths in the outer surface of the work whereby a portion of the work is removed as a chip.

4. A pipe cutting machine comprising a support for the work, a pair of plungers, cutting tools on said plungers having their cutting edges close positioned and adjacent the surface of the work in said support, cams for alternately drawing said plungers and cutters away from the work, and springs for driving said plungers toward the work when the plungers are released by said cams.

5. A pipe cutting machine comprising an anvil, means for rotating a work piece on said anvil, a head, a pair of plungers movable toward and away from said anvil, cutting tools carried by said plungers, rotatable cams for alternately reciprocating said plungers, and means operable by the rotation of said cams for indexing the work on said anvil.

FREDERICK O. RUNNELLS.

REFERENCES CITED

The following references are of record in the file of this patent:

UNITED STATES PATENTS

| Number | Name | Date |
| --- | --- | --- |
| 2,368,965 | Boyce | Feb. 6, 1945 |